(12) United States Patent
Kim (10) Patent No.: US 9,276,291 B2
(45) Date of Patent: Mar. 1, 2016

(54) ELECTROLYTE FOR HIGH VOLTAGE LITHIUM RECHARGEABLE BATTERY AND LITHIUM RECHARGEABLE BATTERY COMPRISING THE SAME

(71) Applicant: Samsung SDI Co., Ltd., Yongin-si (KR)

(72) Inventor: Daesik Kim, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 10 days.

(21) Appl. No.: 13/743,740

(22) Filed: Jan. 17, 2013

(65) Prior Publication Data
US 2014/0050991 A1    Feb. 20, 2014

(30) Foreign Application Priority Data
Aug. 16, 2012    (KR) .................. 10-2012-0089716

(51) Int. Cl.
| | | |
|---|---|---|
| *H01M 6/16* | (2006.01) | |
| *H01M 10/0567* | (2010.01) | |
| *H01M 10/0525* | (2010.01) | |
| *H01M 4/40* | (2006.01) | |
| *H01M 4/505* | (2010.01) | |

(52) U.S. Cl.
CPC ...... *H01M 10/0567* (2013.01); *H01M 10/0525* (2013.01); *H01M 4/405* (2013.01); *H01M 4/505* (2013.01); *H01M 2300/00* (2013.01); *H01M 2300/0017* (2013.01); *Y02E 60/122* (2013.01)

(58) Field of Classification Search
CPC ............ H01M 4/405; H01M 2300/00; H01M 2300/0017
USPC ........................................................ 429/336
See application file for complete search history.

(56) References Cited

U.S. PATENT DOCUMENTS

| | | | |
|---|---|---|---|
| 2003/0091905 | A1 | 5/2003 | Nobuta et al. |
| 2006/0199080 | A1* | 9/2006 | Amine et al. .................. 429/326 |
| 2012/0171576 | A1* | 7/2012 | Tsai et al. ..................... 429/326 |

FOREIGN PATENT DOCUMENTS

| | | |
|---|---|---|
| EP | 1 172 878 A2 | 1/2002 |
| JP | 10-189008 (A) | 7/1998 |
| KR | 10-2003-0032863 (A) | 4/2003 |

* cited by examiner

*Primary Examiner* — Jane Rhee
(74) *Attorney, Agent, or Firm* — Knobbe Martens Olson & Bear, LLP (57) ABSTRACT

In an aspect, an electrolyte for a lithium rechargeable battery and a lithium rechargeable battery are provided. The electrolyte may include a non-aqueous organic solvent, a lithium salt, and an aromatic amine as an additive.

6 Claims, 6 Drawing Sheets

ELECTROLYTE FOR HIGH VOLTAGE LITHIUM RECHARGEABLE BATTERY AND LITHIUM RECHARGEABLE BATTERY COMPRISING THE SAME

CROSS-REFERENCE TO RELATED APPLICATION

This application claims priority to and the benefit of Korean Patent Application No. 10-2012-0089716, filed on Aug. 16, 2012, in the Korean Intellectual Property Office, the disclosure of which is incorporated herein in its entirety by reference.

BACKGROUND

1. Field

Aspects of the present disclosure relate to an electrolyte for a lithium rechargeable battery and a lithium rechargeable battery comprising the same.

2. Description of the Related Technology

Lithium rechargeable batteries having high energy densities as a main power sources or supplemental power sources for high power electric devices such as electric vehicles, or hybrid electric vehicles, while exhibiting high performance is under development. Lithium rechargeable batteries including positive materials such as $LiCoO_2$ have a disadvantage in that a high voltage is difficult to achieve in view of energy density. Therefore, research into new positive active materials, which can replace $LiCoO_2$, is under investigation. Particularly, a manganese (Mn) based lithium oxide has received recent attention. However, a conventional electrolyte using $LiPF_6$ as a lithium salt may be decomposed to generate HF when a fully charged cell using a spinel-type positive active material such as a manganese (Mn) based lithium oxide is stored at a high temperature resulting in elution of metal ions. The eluted metal ions may be deposited on the negative electrode surface. Thus, problems, including an increase in the negative electrode potential and a reduction in the open circuit voltage (OCV) of cell, may be posed, resulting in deterioration of the cycle performance and high temperature storage characteristics.

SUMMARY

Some embodiments provide an electrolyte for a high voltage lithium rechargeable battery and a high voltage lithium rechargeable battery, which can solve a problem occurring when the battery is stored at a high temperature while achieving a high voltage by reducing elution of metal ions at a high temperature and suppressing the metal ions from depositing on a positive electrode surface by forming a membrane on the positive electrode surface.

Some embodiments provide an electrolyte for a high voltage lithium rechargeable battery secondary battery having an operating voltage of 4.3 V or higher, the electrolyte including a non-aqueous organic solvent, a lithium salt, and an additive, wherein the additive is an aromatic amine.

Some embodiments provide a high voltage lithium rechargeable battery including the electrolyte as disclosed and described herein, a positive electrode including a positive electrode active material capable of accepting or releasing lithium ions, and a negative electrode including a negative electrode active material capable of accepting or releasing lithium ions.

In some embodiments, Mn elution in a positive electrode can be prevented by including an aromatic amine to neutralize HF generated by decomposition of a lithium salt dissolved in the electrolyte, thereby improving the high temperature storage characteristic and cycle life characteristic.

In some embodiments, the battery characteristics can be remarkably improved at high voltage.

In some embodiments, the Mn elution by HF generated due to lithium salt decomposition can be prevented when the electrolyte includes an aromatic amine as an additive. For example, a reduction in the open circuit voltage (OCV) of a cell can be suppressed when the cell is stored at a high temperature that includes an electrolyte with an aromatic amine derivative as an additive.

Additional aspects and their advantages set forth in part in the description which follows and may be learned by practice of the embodiments.

BRIEF DESCRIPTION OF THE DRAWINGS

The aspects, features and advantages of the present embodiments will be more apparent from the following detailed description in conjunction with the accompanying drawings, in which.

DETAILED DESCRIPTION

Hereinafter, certain aspects of the present embodiments will be explained in more detail.

Some embodiments provide an electrolyte for a high voltage lithium rechargeable battery having an operating voltage of 4.3 V or higher including: a non-aqueous organic solvent, a lithium salt, and an additive, wherein the additive is an aromatic amine.

In some embodiments, the aromatic amine may be any compound without restriction as long as it can neutralize HF generated due to decomposition of a lithium salt. In some embodiments, the aromatic amine may be a substituted or unsubstituted pyridine, a substituted or unsubstituted pyrazine, a substituted or unsubstituted pyrimidine, a substituted or unsubstituted quinazoline, a substituted or unsubstituted quinolone, or a substituted or unsubstituted isoquinoline. In some embodiments, the aromatic amine may be a substituted or unsubstituted pyrazine, a substituted or unsubstituted pyrimidine, a substituted or unsubstituted quinazoline, a substituted or unsubstituted quinolone, or a substituted or unsubstituted isoquinoline. In some embodiments, the aromatic amine may be a substituted or unsubstituted pyridine. In some embodiments, the aromatic amine is a pyridine derivative of Formula (1):

(1)

wherein $R_1$, $R_2$, $R_3$, $R_4$, and $R_5$ are each independently a hydrogen, a substituted or unsubstituted C1 to C6 alkyl group, a substituted or unsubstituted C1 to C6 alkoxy group, a substituted or unsubstituted C6 to C18 aromatic group, a substituted or unsubstituted amine group, —F, OH, —OCF$_3$, —N(CF$_3$)$_2$ or —CF$_3$, where at least one of $R_1$, $R_2$, $R_3$, $R_4$, and $R_5$ is not hydrogen. In some embodiments, the substituted or unsubstituted pyridine derivative is at least one selected from pyridine derivatives of Formulas (19) to (21):

(19)

Pyridine derivative 1

(20)

Pyridine derivative 2

(21)

Pyridine derivative 3

Unless otherwise indicated, the term "substituted," refers to a group in which, one, or more than one of the hydrogen atoms has been replaced with one or more group(s) individually and independently selected from: alkyl, alkenyl, cycloalkenyl, alkynyl, cycloalkyl, aryl, arylO—, alkenylO—, cycloalkylC(=O)—, arylC(=O)—, arylC(=O)NH—, aryl-NHC(=O)—, aryl(CH$_2$)$_{0-3}$O(CH$_2$)$_{0-3}$—, HO(CH$_2$)$_{1-3}$NH—, HO(CH$_2$)$_{1-3}$O—, HO(CH$_2$)$_{1-3}$—, HO(CH$_2$)$_{1-3}$O(CH$_2$)$_{1-3}$—, —C(=O)NHNH$_2$, heteroaryl, hydroxy, alkoxy, cyano, halo, oxo, O-carbamyl, N-carbamyl, C-amido, N-amido, C-carboxy, O-carboxy, nitro, and amino.

The term "O-carboxy" refers to the group consisting of formula RC(=O)O—, covalently bonded to the parent molecule through an —O— linkage.

The term "C-carboxy" refers to the group consisting of formula —C(=O)OR, covalently bonded to the parent molecule through a —C— linkage.

The substituent "R" appearing by itself and without a number designation refers to a substituent selected from alkyl, cycloalkyl, aryl, and heteroaryl (bonded through a ring carbon).

The term "O-carbamyl" refers to the group consisting of formula —OC(=O)—NR, covalently bonded to the parent molecule through a —O— linkage.

The term "N-carbamyl" refers to the group consisting of formula ROC(=O)NH—, covalently bonded to the parent molecule through a —N— linkage.

The term "C-amido" refers to the group consisting of formula —C(=O)—NR$_2$, covalently bonded to the parent molecule through a —C— linkage.

The term "N-amido" refers to the group consisting of formula RC(=O)NH—, covalently bonded to the parent molecule through a —N— linkage.

The term "oxo" refers to the group consisting of formula =O.

The term "amide" refers to a chemical moiety with formula —(R)$_n$—C(=O)NHR' or —(R)$_n$—NHC(=O)R', covalently bonded to the parent molecule through a —C— or —N— linkage, where R is selected from alkyl, cycloalkyl, aryl, and heteroaryl (bonded through a ring carbon), where n is 0 or 1 and R' is selected from hydrogen, alkyl, cycloalkyl, aryl, and heteroaryl (bonded through a ring carbon).

The term "amino" refers to a chemical moiety with formula —NHR'R", covalently bonded to the parent molecule through a —N— linkage, where R' and R" are each independently selected from hydrogen, alkyl, cycloalkyl, aryl, heteroaryl (bonded through a ring carbon) and heteroalicyclic (bonded through a ring carbon).

As used herein, the term "alkyl" refers to a branched or unbranched fully saturated aliphatic hydrocarbon group. In some embodiments, alkyls may be substituted or unsubstituted. Alkyls include, but are not limited to, methyl, ethyl, propyl, isopropyl, butyl, isobutyl, tertiary butyl, pentyl, hexyl, cyclopropyl, cyclopentyl, cyclohexyl, cycloheptyl and the like, each of which may be optionally substituted in some embodiments. In some embodiments, the alkyl may have C1 to C6 carbon atoms. For example, C$_{1-6}$alkyl includes, but is not limited to, methyl, ethyl, propyl, isopropyl, butyl, isobutyl, sec-butyl, pentyl, 3-pentyl, hexyl, cyclopropyl, cyclobutyl cyclopentyl, cyclohexyl, and the like.

As used herein, the term "halo" or "halogen" refers to F (fluoro), Cl (chloro), Br (bromo) or I (iodo).

As used herein, the term "cycloalkyl" refers to saturated aliphatic ring system having three to twenty carbon atoms. A cycloalkyl refers to monocyclic and polycyclic saturated aliphatic ring system including, but not limited to, cyclopropyl, cyclopentyl, cyclohexyl, cycloheptyl, bicyclo[4.4.0]decanyl, bicyclo[2.2.1]heptanyl, adamantyl, norbornyl, and the like. In certain embodiments, a cycloalkyl comprises 3 to 20 carbon atoms (whenever it appears herein, a numerical range such as "3 to 20" refers to each integer in the given range; e.g., "3 to 20 carbon atoms" means that a cycloalkyl group may comprise only 3 carbon atoms, etc., up to and including 20 carbon atoms, although the term "cycloalkyl" also includes instances where no numerical range of carbon atoms is designated). A cycloalkyl may be designated as "C$_3$-C$_7$ cycloalkyl" or similar designations. By way of example only, "C$_3$-C$_6$ cycloalkyl" indicates a cycloalkyl having two, three, four, five or six carbon atoms, e.g., the cycloalkyl is selected from cyclopropyl, cyclobutyl, cyclopentyl, and cyclohexyl.

As used herein, the term "alkoxy" refers to an alkyl radical covalently bonded to the parent molecule through an —O— linkage. In some embodiments, alkoxys may be substituted or unsubstituted. Examples of alkoxy groups include, but are not limited to, methoxy, ethoxy, propoxy, isopropoxy, butoxy, n-butoxy, sec-butoxy, t-butoxy, cyclopropyloxy, cyclobutyloxy, cyclopentyloxy, cyclohexyloxy cycloheptyloxy, and the like. In some embodiments, the alkoxy may have C1 to C10 carbon atoms.

As used herein, the term "alkenyl" refers to a radical of from two to twenty carbon atoms containing at least one carbon-carbon double bond including, but not limited to, 1-propenyl, 2-propenyl, 2-methyl-1-propenyl, 1-butenyl, 2-butenyl, cyclopropenyl, cyclopentenyl, cyclohexenyl, cycloheptenyl and the like. In some embodiments, alkenyls may be substituted or unsubstituted. In some embodiments, the alkenyl may have C2 to C4 carbon atoms.

As used herein, the term "alkynyl group" refers to a monovalent straight or branched chain radical of from two to twenty carbon atoms containing at least one carbon-carbon triple bond including, but not limited to, 1-propynyl, 1-butynyl, 2-butynyl, and the like. In some embodiments, alkynyls may be substituted or unsubstituted. In some embodiments, the alkynyl may have C2 to C4 carbon atoms.

As used herein, the term "aryl" refers to aromatic radical having one ring and optionally an appended ring, or multiple fused rings. Examples of aryl groups include, but are not limited to, phenyl, biphenyl, naphthyl, phenanthrenyl, naphthacenyl, and the like. In some embodiments, aryls may be substituted or unsubstituted. In some embodiments, the aryl can be a "heteroaryl" group.

As used herein, the term "heteroaryl" refers refers to an aromatic ring system radical in which one or more ring atoms are not carbon, namely heteroatom, having one ring or multiple fused rings. In fused ring systems, the one or more heteroatoms may be present in only one of the rings. Examples of heteroatoms include, but are not limited to, oxygen, sulfur and nitrogen. Examples of heteroaryl groups include, but are not limited to, furanyl, thieny, imidazolyl, quinazolinyl, quinolinyl, isoquinolinyl, quinoxalinyl, pyridinyl, pyrrolyl, oxazolyl, indolyl, and the like.

In some embodiments, the aromatic amine derivative may be a substituted or unsubstituted C5-C30 pyridine.

In some embodiments, the pyridine derivative is a compound having the structure of Formula 1:

(1)

wherein $R_1$, $R_2$, $R_3$, $R_4$, and $R_5$ are each independently a H (hydrogen), substituted or unsubstituted C1 to C6 alkyl group, a substituted or unsubstituted C6 to C18 aromatic radical, —F, —OH, —NH$_2$, OCF$_3$, —N(CF$_3$)$_2$, or —CF$_3$. In some embodiments, at least one of $R_1$, $R_2$, $R_3$, $R_4$, and $R_5$ is not hydrogen.

In some embodiments, the additive exhibits advantageous effects in the high voltage lithium rechargeable battery operating at 4.3 V or higher. In some embodiments, the high voltage lithium rechargeable battery may have an operating voltage of 4.3 V to 5 V. In some embodiments, the high voltage lithium rechargeable battery may have an operating voltage of 4.35 V to 4.8 V.

In a rechargeable battery having an operating voltage of 4.3 V or higher, high temperature storage and life characteristics can be sharply increased with addition of a pyridine derivative.

In some embodiments, the amine derivative may be included in the electrolyte in an amount of 0.05 wt % to 8 wt % based on the weight of the non-aqueous organic solvent.

In some embodiments, the shortage may lower HF capturing capability when the amount of the additive is less than 0.05 wt %. In some embodiments, the excess may reduce battery capacity when the amount of the additive is greater than 8 wt %.

In some embodiments, the electrolyte may further include a lithium salt and a non-aqueous organic solvent. The lithium salt acts in a battery as a supply source of lithium ions, making the basic operation of a lithium secondary battery possible. The non-aqueous organic solvent serves as a medium through which ions participating in electrochemical reaction of the battery can move.

In some embodiments, the lithium salt may be one or more selected from the group consisting of LiPF$_6$, LiBF$_4$, LiSbF$_6$, LiAsF$_6$, LiN(SO$_2$C$_2$F$_5$)$_2$, Li(CF$_3$SO$_2$)$_2$N, LiN(SO$_3$C$_2$F$_5$)$_2$, LiC$_4$F$_9$SO$_3$, LiClO$_4$, LiAlO$_2$, LiAlCl$_4$, LiN(C$_x$F$_{2x+1}$SO$_2$)(C$_y$F$_{2y+1}$SO$_2$), where each of x and y are natural numbers of 1 to 20, respectively, LiCl, LiI, LiB(C$_2$O$_4$)$_2$, and lithium bis(oxalato) borate.

Since the pyridine derivative according to the present invention can form a film on a surface of a positive or negative electrode, lithium salts other than a fluorine-based lithium salt have high temperature storage characteristics. Use of the fluorine-based lithium salt leads to more desirable effects by film formation on the positive or negative electrode surface and HF reduction.

In some embodiments, a concentration of the lithium salt may be in a range of 0.6 M to 2.0 M, with respect to the non-aqueous organic solvent. In some embodiments, a concentration of the lithium salt may be in a range of 0.7 M to 1.6 M, with respect to the non-aqueous organic solvent. In some embodiments, the electrolyte performance deteriorates due to its lack of ionic conductivity. When the concentration of the lithium salt is greater than 2.0 M, the lithium ion mobility deteriorates due to an increase of the electrolyte viscosity when the concentration of the lithium salt is less than 0.6 M.

In some embodiments, the non-aqueous organic solvent component may include one or more selected from the group consisting of dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC). In some embodiments, the non-aqueous organic solvent component may include one or more selected from the group consisting of γ-butyrolactone, methylacetate, ethyl acetate, and n-propyl acetate. In some embodiments, the non-aqueous organic solvent component may include dibutyl ether.

In some embodiments, the non-aqueous organic solvent may include an aromatic hydrocarbon organic solvent. In some embodiments, the aromatic hydrocarbon organic solvent may include one or more selected from the group consisting of benzene, fluorobenzene, bromobenzene, chlorobenzene, cyclohexylbenzene, isopropylbenzene, n-butylbenzene, octylbenzene, toluene, xylene, and mesitylene.

Some embodiments provide a high voltage lithium rechargeable battery having an operating voltage of 4.3 V or higher, the battery including a positive electrode, a negative electrode, a separator, and an electrolyte as disclosed and described herein. In some embodiments, the battery may have an operating voltage of 4.3 V to 5 V. In some embodiments, the battery may have an operating voltage of 4.35 V to 4.8 V. In some embodiments, the aromatic amine may be a substituted or unsubstituted pyridine, a substituted or unsubstituted pyrazine, a substituted or unsubstituted pyrimidine, a substituted or unsubstituted quinazoline, a substituted or unsubstituted quinolone, or a substituted or unsubstituted isoquinoline. In some embodiments, the aromatic amine may be a substituted or unsubstituted pyrazine, a substituted or unsubstituted pyrimidine, a substituted or unsubstituted quinazoline, a substituted or unsubstituted quinolone, or a substituted or unsubstituted isoquinoline. In some embodiments, the aromatic amine may be a substituted or unsubstituted pyridine. In some embodiments, the aromatic amine may be a pyridine derivative of Formula (1):

(1)

wherein $R_1$, $R_2$, $R_3$, $R_4$, and $R_5$ may each be independently a hydrogen, a substituted or unsubstituted C1 to C6 alkyl group, a substituted or unsubstituted C1 to C6 alkoxy group, a substituted or unsubstituted C6 to C18 aromatic group, a substituted or unsubstituted amine group, —F, OH, —OCF$_3$, —N(CF$_3$)$_2$ or —CF$_3$, where at least one of $R_1$, $R_2$, $R_3$, $R_4$, and $R_5$ is not hydrogen. In some embodiments, the substituted or unsubstituted pyridine derivative may be at least one selected from pyridine derivatives of Formulas (19) to (21):

(19)

Pyridine derivative 1

(20)

Pyridine derivative 2

(21)

Pyridine derivative 3

In some embodiments, the lithium salt may be one or more selected from the group consisting of LiPF$_6$, LiBF$_4$, LiSbF$_6$, LiAsF$_6$, and LiN(SO$_2$C$_2$F$_5$)$_2$. In some embodiments, the positive electrode active material includes compounds of Formulas 14 to 18:

$$Li_{1+x}Ni_yMn_{1-y-z}M_zO_2 \quad (14),$$

wherein $0 \leq x < 0.2$, $0.4 \leq y \leq 0.6$, $0 \leq z \leq 0.2$, $0 \leq w \leq 0.1$, and M may be at least one selected from the group consisting of Co, Al, Ti, Mg, and Zn;

$$Li_{1+x}Ni_yMn_{2-y-z}M_zO_{4+w} \quad (15),$$

wherein $0 \leq x < 0.2$, $0.4 \leq y \leq 0.6$, $0 \leq z \leq 0.2$, $0 \leq w \leq 0.1$, and M may be at least one selected from the group consisting of Al, Ti, Mg, and Zn;

$$Li_{1+z}Ni_bMn_cCo_{1-(b+c)}O_2 \quad (16),$$

wherein $0 \leq z < 0.1$, $0.2 \leq b \leq 0.7$, $0.2 \leq c \leq 0.7$, and $b+c<1$;

$$LiCoPO_4 \quad (17);$$

and $$LiFePO_4 \quad (18).$$

Positive Electrode

In some embodiments, the positive electrode may be prepared by forming a positive electrode slurry composition by mixing a positive electrode additive as disclosed herein, a positive electrode active material, a conductive agent and a binder with a solvent, coating the resultant mixture on a positive electrode current collector, drying and compressing. According to necessity, a filler or a viscosity adjusting agent may further be added.

In some embodiments, a metal, such as aluminum, copper, nickel, silver or stainless steel, and metal alloys thereof, may be used as the positive electrode current collector. In some embodiments, aluminum or an aluminum alloy may be used as the positive electrode current collector. In some embodiments, the positive electrode current collector may be formed to a thickness of 3 to 500 μm.

Any positive electrode active material that can be generally used in the conventional rechargeable battery may be used as the positive electrode active material. In some embodiments, a spinel-type positive electrode active material may be used as the positive electrode active material.

In some embodiments, the positive electrode active material may include at least one lithium manganese based active materials selected from the group consisting of the following compounds represented by Formulas (2) to (15), a lithium nickel cobalt manganese based active material represented by Formula (16), and a phosphate active material represented by Formula 17 or 18.

$$LiMnA_2 \quad (2)$$

$$Li_xMnA_2 \quad (3)$$

$$LiMnO_{2-z}A_z \quad (4)$$

$$Li_xMnO_{2-z}A_z \quad (5)$$

$$LiMn_{1-y}M_yA_2 \quad (6)$$

$$Li_xMn_{1-y}M_yA_2 \quad (7)$$

$$LiMn_2A_4 \quad (8)$$

$$Li_xMn_2O_4 \quad (9)$$

$$LiMn_2O_{4-z}A_z \quad (10)$$

$$Li_xMn_2O_{4-z}A_z \quad (11)$$

$$LiMn_{2-y}M_yA_4 \quad (12)$$

$$Li_xMn_{2-y}M_yA_4 \quad (13)$$

wherein $1.0 \leq x \leq 1.2$, $0.01 \leq y \leq 0.1$, $0.01 \leq z \leq 0.5$, M may be at least one transition metal selected from the group consisting of Al, Cr, Co, Mg, La, Ce, Sr and V and a lanthanide metal, and A may be at least one element selected from the group consisting of O (oxygen), F (fluorine), S (sulfur) and P (phosphorus), $$Li_{1+x}Ni_yMn_{1-y-z}M_zO_2 \quad (14),$$

wherein $0 \leq x < 0.2$, $0.4 \leq y \leq 0.6$, $0 \leq z \leq 0.2$, $0 \leq w \leq 0.1$, and M may be at least one selected from the group consisting of Co, Al, Ti, Mg, and Zn;

$$Li_{1+x}Ni_yMn_{2-y-z}M_zO_{4+w} \quad (15),$$

wherein $0 \leq x < 0.2$, $0.4 \leq y \leq 0.6$, $0 \leq z \leq 0.2$, $0 \leq w \leq 0.1$, and M may be at least one selected from the group consisting of Al, Ti, Mg, and Zn;

$$Li_{1+z}Ni_bMn_cCo_{1-(b+c)}O_2 \quad (16),$$

wherein $0 \leq z < 0.1$, $0.2 \leq b \leq 0.7$, $0.2 \leq c \leq 0.7$, and $b+c<1$;

$$LiCoPO_4 \quad (17);$$

and $$LiFePO_4 \quad (18).$$

In some embodiments, the electrolyte as disclosed herein may be used in a high voltage battery. In some embodiments, the following active materials having high voltage characteristics, represented by Formulas 14 to 18 may be used in a high voltage battery.

In some embodiments, a positive electrode active material having a coating applied on a surface of each of the compounds may also be used as the positive electrode active material.

In some embodiments, a non-aqueous solvent or an aqueous solvent may be used as the solvent.

In some embodiments, the non-aqueous solvent may include one or more selected from the group consisting of N-methyl-2-pyrrolidone (NMP), dimethylformamide, dimethylacetamide, N,N-dimethylaminopropylamine, ethyleneoxide, and tetrahydrofuran.

In some embodiments, a binder may be used. The binder binds the anode active material particles to each other, and binds the positive electrode active material to a current collector. In some embodiments, the binder may include one or more selected from the group consisting of polyvinylalcohol, carboxymethylcellulose, hydroxypropylcellulose, polyvinylchloride, carboxylated polyvinylchloride, polyvinylfluoride, a polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, and nylon, or the like, but is not limited thereto. In some embodiments, polyvinylidene fluoride may be the binder.

The conductive agent provides an electrode with conductivity, and may not be limited to any particular material as long as the material is electronically conductive and does not change the chemical properties of a battery including the conductive agent. In some embodiments, the conductive agent may be added in an amount of 1 up to 30 wt % based on the total weight of the electrode slurry composition. In some embodiments, the conductive agent may include a carbonaceous material, such as natural graphite, artificial graphite, carbon black, acetylene black, ketjen black, or carbon fiber, a metallic material, such as copper, nickel, aluminum, or silver, a conductive polymer such as polyphenylene, mixtures thereof, and the like.

In some embodiments, a filler may be used. The filler is an auxiliary component used to suppress electrode swelling, and may not be limited to any particular material as long as the material does not change the chemical properties of a battery including the filler. In some embodiments, the filler may include olefin-based polymers, such as polyethylene or polypropylene, and fibrous materials, such as glass fiber or carbon fiber.

In some embodiments, a viscosity adjusting agent may be used. The viscosity adjusting agent adjusts the viscosity of the electrode slurry composition to facilitate steps of mixing the electrode slurry composition and coating the electrode slurry composition on a current collector, and may be added in an amount of 30 wt % or less based on the total weight of the electrode slurry composition. In some embodiments, the viscosity adjusting agent may include, but not limited to, carboxymethylcellulose, polyvinylidene fluoride. In some cases, the solvent used in preparing the positive electrode slurry composition may serve as the viscosity adjusting agent.

Negative Electrode

In some embodiments, negative electrode may include a negative electrode active material capable of accepting or releasing lithium ions.

In some embodiments, the negative electrode may be prepared by forming a slurry composition by dispersing the negative electrode active material, a binder and a conductive agent in a solvent and coating the slurry composition on a negative electrode current collector.

In some embodiments, the negative electrode active material may include one or more selected from the group consisting of a compound through which lithium ions can be reversibly intercalated and deintercalated, a metallic material alloyable with lithium, and a mixture thereof. Examples of the carbonaceous material include at least one selected from the group consisting of artificial graphite, natural graphite, graphitized carbon fiber, graphitized mesocarbon microbeads, fullerene, amorphous carbon, and mixtures thereof. In some embodiments, the amorphous carbon may include hard carbon, cokes, MCMB sintered at 1500° C. or less, MPCF, and the like. In some embodiments, the metallic material alloyable with lithium include at least one metal selected from the group consisting of Al, Si, Sn, Pb, Zn, Bi, In, Mg, Ga, Cd and Ge. These metals may be used alone or in mixtures or alloys. In some embodiments, the metals may also be used in combination with the carbonaceous material.

In some embodiments, the negative electrode may be prepared by coating a negative electrode slurry obtained by mixing the negative electrode slurry composition in a solvent on a negative electrode current collector, drying and compressing.

In some embodiments, the negative electrode current collector may include one or more selected from a punched metal, an X-punched metal, a gold foil, a foamed metal, a granular metal fiber sintered body, a nickel foil, and a copper foil.

In some embodiments, the solvent, the binder and the conductive agent may be the same as those of the positive electrode active material slurry.

Separator

In some embodiments, the lithium rechargeable battery may also include a separator for preventing a short circuit between the positive electrode and the negative electrode and providing a transport channel from the lithium ions.

Examples of the separator may include a polyolefin based polymer film such as polypropylene, polyethylene, polyethylene/polypropylene, polyethylene/polypropylene/polyethylene, and polypropylene/polyethylene/polypropylene, a multi-layered film thereof, a micro-porous film thereof, a woven textile fabric thereof, non-woven textile fabric thereof, or other well-known ones may be used as the separator. In some embodiments, a film formed by coating a resin having an excellent stability on the micro-porous polyolefin film may additionally be used as the separator. When a solid electrolyte is used as the polymer, it may also serve as the separator.

In some embodiments, the separator may be interposed between the positive electrode and the negative electrode. In some embodiments, an insulating thin film having high ion permittivity and mechanical strength may be used as the separator. In some embodiments, the separator may have a porosity diameter of 0.01 to 10 μm and a thickness of 5 to 300 μm.

The lithium rechargeable battery is generally classified into a lithium ion battery, a lithium ion polymer battery, a lithium polymer battery according to the kind of electrolyte used. The lithium secondary battery is also classified into a cylindrical battery, a prismatic battery, a coin-type battery, and a pouch-type battery according to the external shape of battery. The lithium secondary battery may also be classified into a bulk type battery and a thin film type battery according to the size of battery.

Some embodiments provide a lithium rechargeable battery including the negative electrode as disclosed and described herein.

Figure 1:
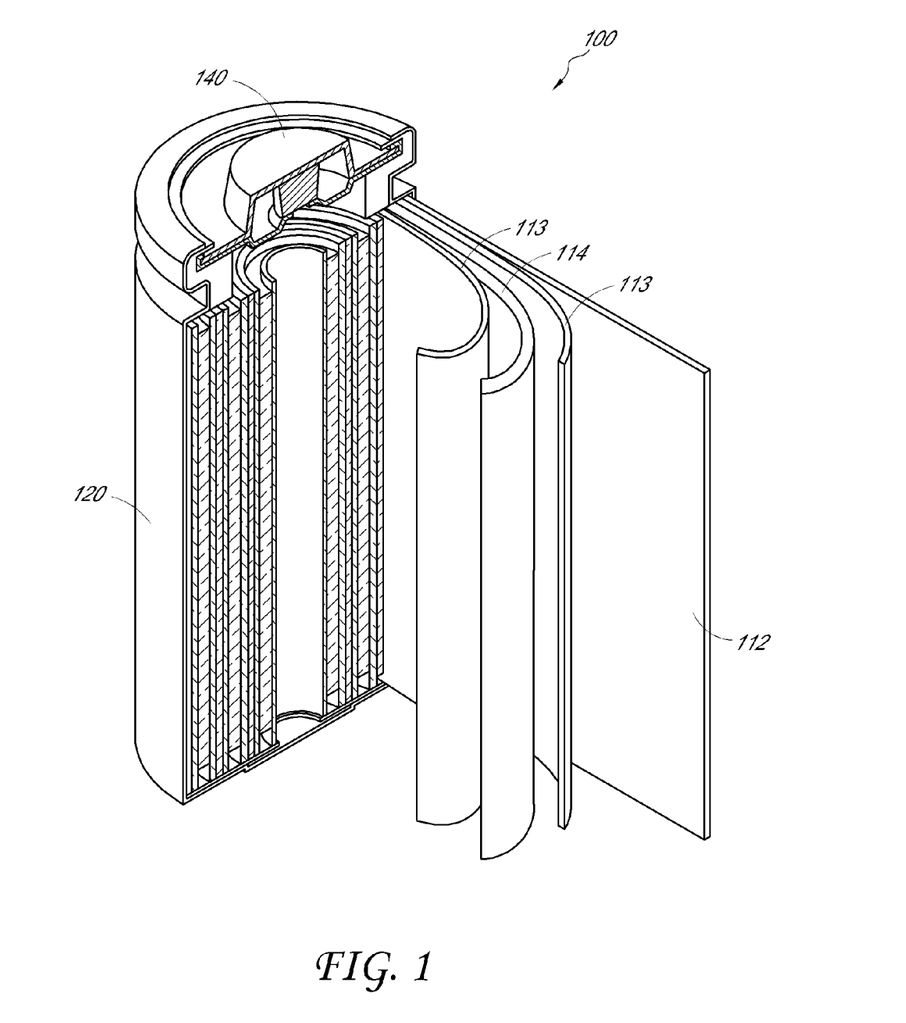
FIG. 1 is a partially cross-sectional view of a cylindrical battery according to an embodiment.

FIG. 1 is a partially cross-sectional view of a cylindrical battery according to an embodiment. While FIG. 1 shows a cylindrical battery, the present embodiments are not limited by the type of battery. For example, a prismatic battery or a pouch-type battery may also be applied to the present embodiments.

The configurations and manufacturing methods of the prismatic battery or a pouch-type battery are well known in the art.

In some embodiments, the lithium rechargeable battery 100 may be a cylindrical battery and largely includes a negative electrode 112, a positive electrode 114, a separator 113 disposed between the negative electrode 112 and the positive electrode 114, an electrolyte (not shown) impregnated in the negative electrode 112, the positive electrode 114 and the separator 113, a battery case 120, and a sealing member 140 sealing the battery case 120 as shown in FIG. 1,. In some embodiments, the lithium rechargeable battery 100 may be manufactured by sequentially stacking the negative electrode 112, the positive electrode 114 and the separator 113, winding the stacked structure in a spiral configuration and accommodating the same in the battery case 120.

In some embodiments, the negative electrode 112, the positive electrode 114, the separator 113 and the electrolyte are the same as described above.

The following examples further illustrate the present embodiments in detail, but are not to be construed to limit the scope thereof. The comparative examples are not admitted as prior art and are included for comparative purposes to understand the effect of the present embodiments on certain evaluated properties.

EXAMPLE 1

Particles having an average particle diameter of 10 μm as a positive active material with a bulk formula represented by $LiNi_{0.5}Mn_{1.5}O_4$, a carbon-based conductive agent and polyvinylidenefluoride (PVdF) as a binder were mixed and dispersed in N-methyl-2-pyrrolidone (NMP) in a weight ratio of 94:3:3 to prepare a positive active material slurry. Subsequently, the positive active material slurry was cast on an aluminum thin film, dried in a vacuum oven maintained at 120° C. and compressed to prepare a positive electrode. Graphite (MAG V4) was used as an active material for forming a negative electrode.

A separator made of 18 μm thick polypropylene was interposed between the obtained positive and negative electrodes and a non-aqueous electrolyte was included to manufacture 18650 and 2016 batteries. A non-aqueous electrolyte having 1.15 M $LiPF_6$ dissolved in EC/EMC/DMC=3/3/4 (weight ratio) was used as the non-aqueous electrolyte.

Pyridine was added in an amount of 1 wt % as an electrolyte additive based on the weight of the non-aqueous.

The same compositions of the positive electrode, the negative electrode, the separator and the electrolyte are used in the 2016 and 18650 cell batteries.

EXAMPLES 2-8

Lithium rechargeable batteries were manufactured in the same manner as in Example 1, except that non-aqueous electrolytes were prepared by varying the kinds and amounts of additives that were used.

Particles having an average particle diameter of 10 μm as a positive active material with a bulk formula represented by $LiNi_{0.5}Mn_{1.5}O_4$, a carbon-based conductive agent and polyvinylidenefluoride (PVdF) as a binder were mixed and dispersed in N-methyl-2-pyrrolidone (NMP) in a weight ratio of 94:3:3 to prepare a positive active material slurry. Subsequently, the positive active material slurry was cast on an aluminum thin film, dried in a vacuum oven maintained at 120° C. and compressed to prepare a positive electrode. Graphite (MAG V4) was used as an active material for forming a negative electrode.

A separator made of 18 μm thick polypropylene was interposed between the obtained positive and negative electrodes and a non-aqueous electrolyte was included to manufacture 2016 coin cell type batteries. A non-aqueous electrolyte having 1.15 M $LiPF_6$ dissolved in EC/EMC/DMC=3/3/4 (weight ratio) was used as the non-aqueous electrolyte.

As the electrolyte additive, appropriate amounts of pyridine 1 and pyridine derivatives 1, 2 and 3 of Formulas 19 to 21 were added to the non-aqueous electrolyte.

(19)

(20)

Pyridine derivative 2

-continued

Pyridine derivative 3

(21)

TABLE 1

| | Additive | | |
|---|---|---|---|
| | Kind | Amount (wt %) | Active material |
| Example 2 | Pyridine | 0.1 | $LiNi_{0.5}Mn_{1.5}O_4$ |
| Example 3 | Pyridine | 2 | $LiNi_{0.5}Mn_{1.5}O_4$ |
| Example 4 | Pyridine | 8 | $LiNi_{0.5}Mn_{1.5}O_4$ |
| Example 5 | Pyridine | 0.05 | $LiNi_{0.5}Mn_{1.5}O_4$ |
| Example 6 | Pyridine derivative of Formula 19 | 2 | $LiNi_{0.5}Mn_{1.5}O_4$ |
| Example 7 | Pyridine derivative of Formula 20 | 2 | $LiNi_{0.5}Mn_{1.5}O_4$ |
| Example 8 | Pyridine derivative of Formula 21 | 2 | $LiNi_{0.5}Mn_{1.5}O_4$ |

COMPARATIVE EXAMPLE 1

A lithium rechargeable battery was manufactured in the same manner as in Example 1, except that pyridine or a pyridine derivative was not added as an electrolyte additive.

Evaluation of Battery Performance

Figure 2:
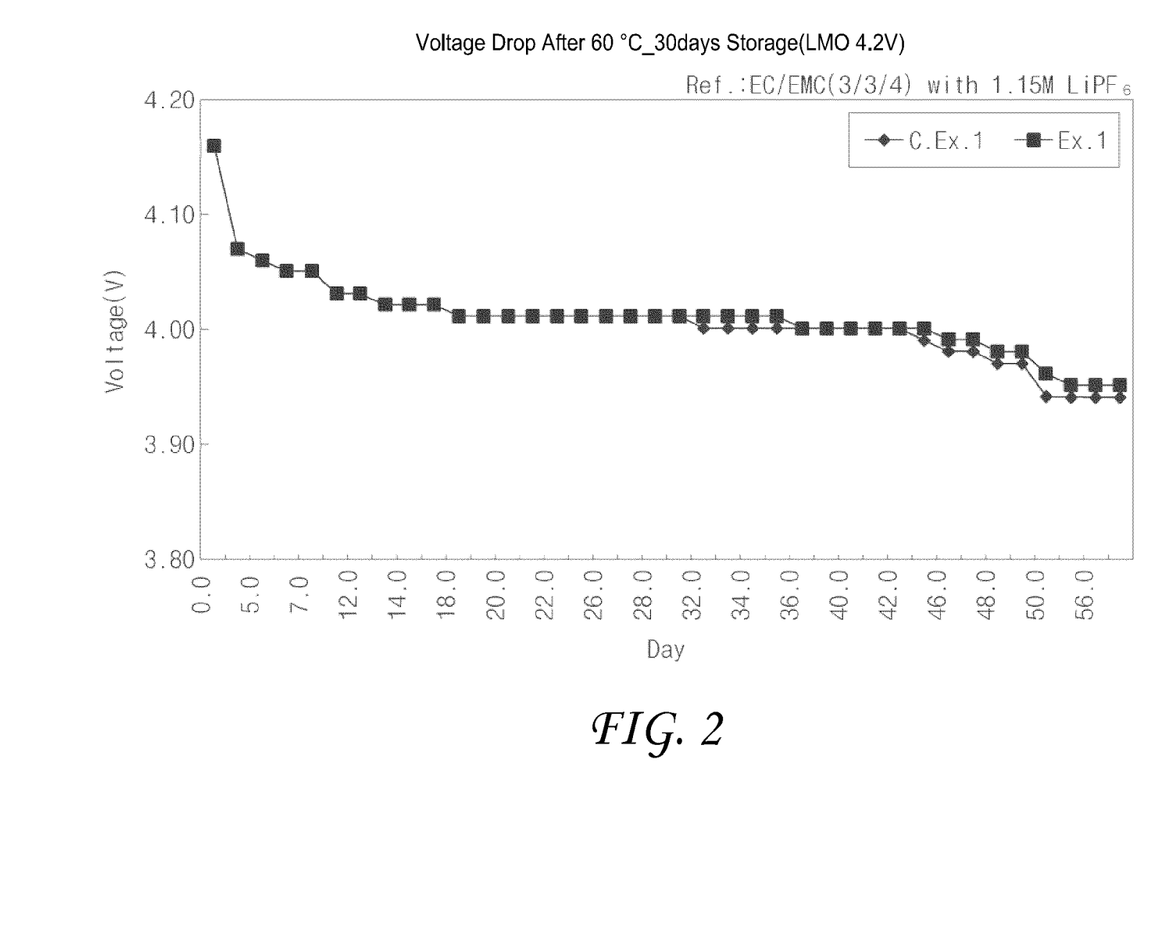
FIG. 2 is a graph showing results of the experiment conducted by a method of Experimental Example 1 in lithium rechargeable batteries assembled using 18650 cylindrical cells according to Example 1 of the present disclosure and Comparative Example 1.
Figure 3:
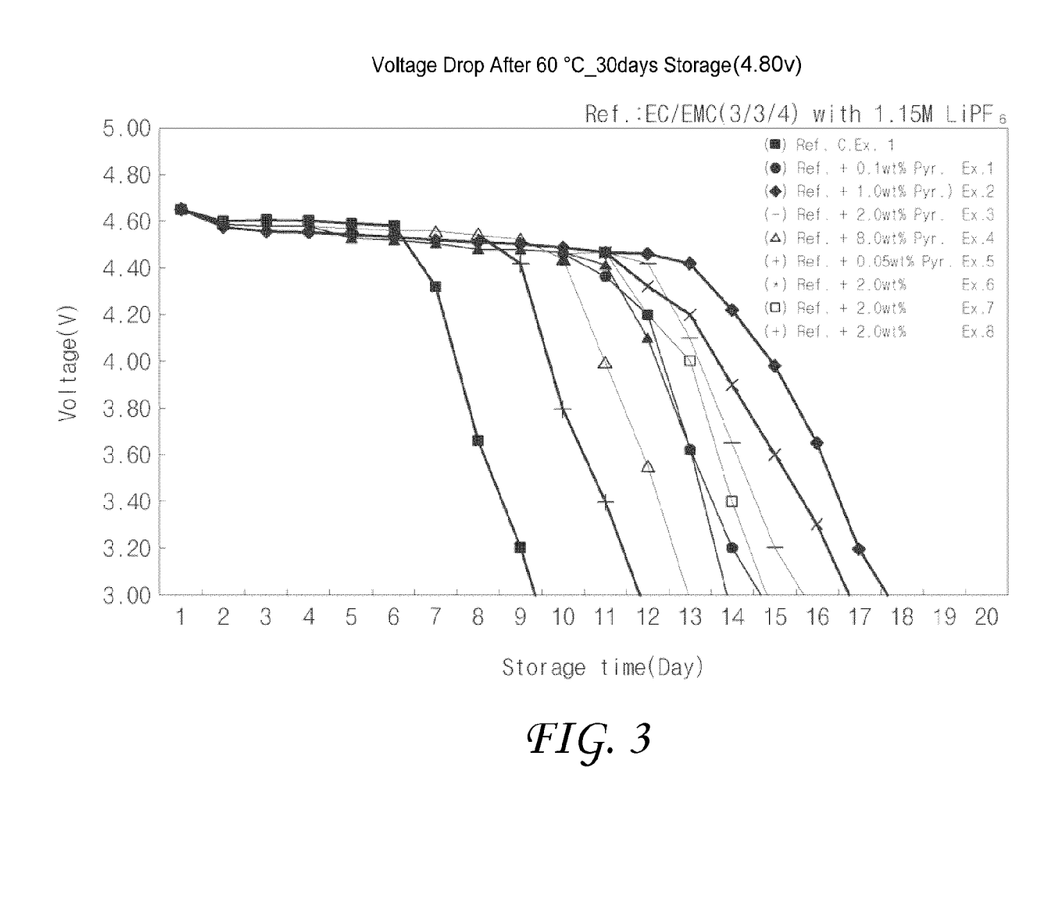
FIG. 3 is a graph showing results of the experiment conducted by a method of Experimental Example 2 in lithium rechargeable batteries assembled using 2016 coin full cells according to Example 1 of the present disclosure and Comparative Example 1.
Figure 4:
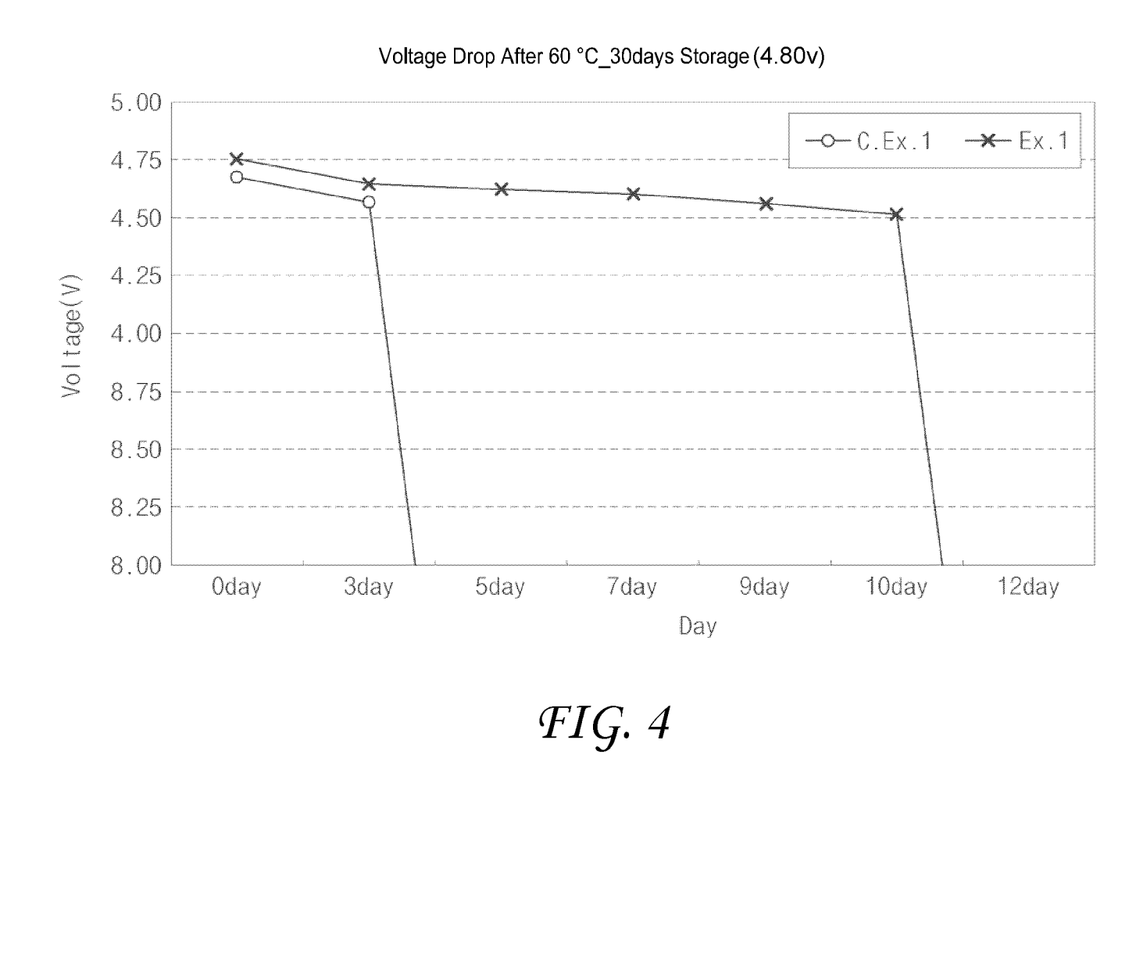
FIG. 4 is a graph showing results of the experiment conducted by the method of Experimental Example 2 in lithium rechargeable batteries assembled using 18650 cylindrical cells according to Example 1 of the present disclosure and Comparative Example 1.
Figure 5:
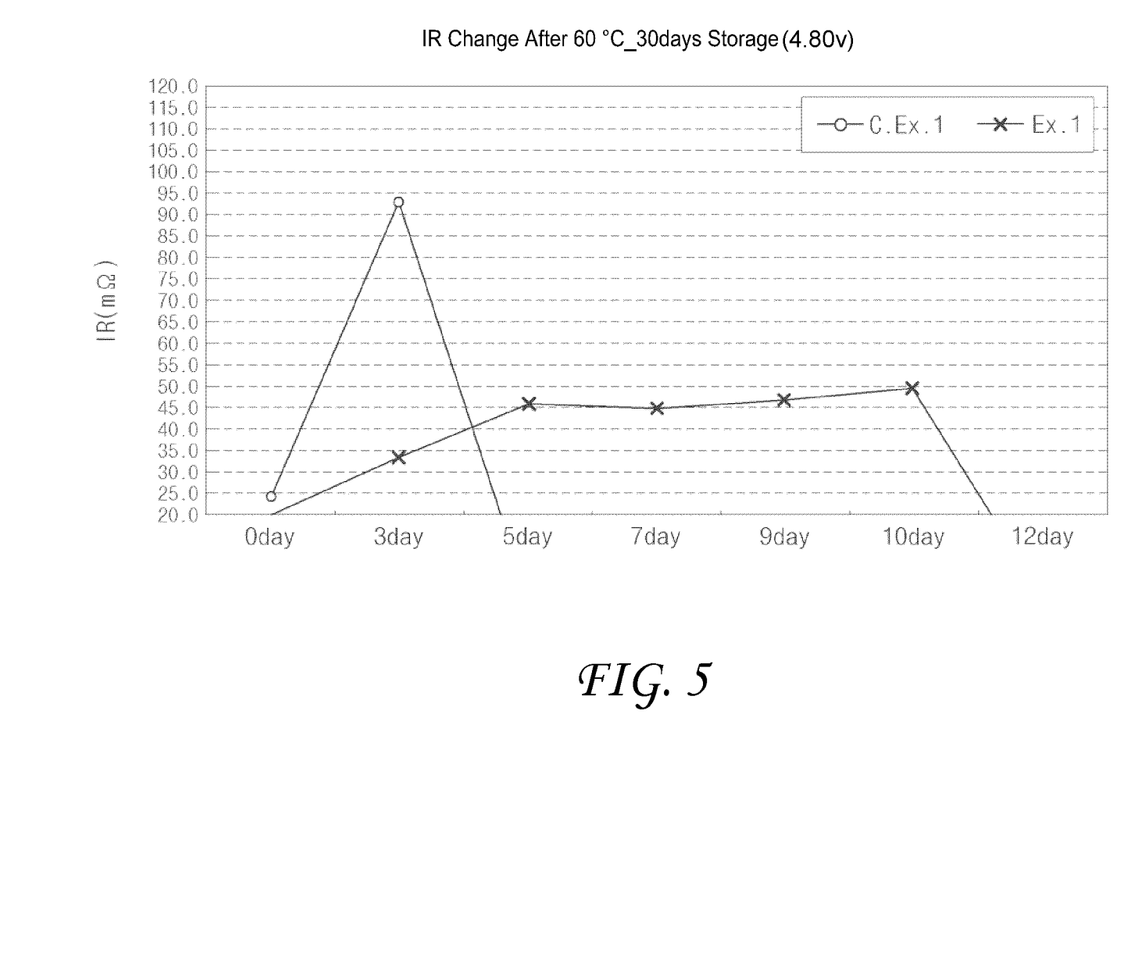
FIG. 5 is a graph showing results of the experiment conducted by the method of Experimental Example 2 in lithium rechargeable batteries assembled using 18650 cylindrical cells according to Example 1 of the present disclosure and Comparative Example 1.

FIGS. 2, 4 and 5 show evaluation results of lithium rechargeable batteries assembled using 18650 cylindrical cells (Comparative Example 1 and Example 1). FIG. 3 shows evaluation results of lithium rechargeable batteries assembled using 2016 coin cells (Comparative Example 1 and Examples 1-8).

EXPERIMENTAL EXAMPLE 1

Evaluation of High-Temperature Storage Characteristic at Operating Voltage of 4.2 V High-temperature storage experiments were performed on 18650 cylindrical type batteries (Li/graphite) according to Example 1 and Comparative Example 1 at 60° C. First, formation charging/discharging were performed twice with 0.2 C/0.5 C, and charge and discharge tests were performed each one time with the standard charge/discharge current density of 0.5 C to reach between about 4.2 V and the standard discharge current density of 0.2 C to reach about 3.0 V. In the 60° C. high-temperature storage experiments, the charge current was 0.5 C and the batteries were stored in a constant chamber maintained at 60° C. for 30 days, and the results are shown in FIG. 2. As shown in FIG. 2, a significant difference in the high-temperature storage characteristic was not demonstrated at 4.2 V irrespective of whether pyridine was present or not present.

EXPERIMENTAL EXAMPLE 2

Evaluation of High-Temperature Storage Characteristic at Operating Voltage of 4.8 V High-temperature storage experiments were performed on 2016 coin type batteries (Li/graphite) and 18650 cylindrical batteries according to Examples 1-8 and Comparative Example 1 at 60° C. The 60° C. high-temperature storage experiments were performed in substantially the same manner as in Experimental Example 1, except that the charge test was performed to reach 4.8 V, and the results are shown in FIGS. 3 to 5. As shown in FIG. 3 (2016 coin cells), a sharp voltage drop was demonstrated 10 days before the high-temperature storage of the battery according to Comparative Example 1, in which pyridine or a pyridine derivative was not used as an additive. In the batteries according to Examples 1 to 5 each including pyridine or a pyridine derivative as an additive, an OCV drop was delayed. However, in Example 5 in which only a small amount of additive was used, the effect of including an additive was not noticeable. In addition, in Example 5 in which an excessive amount of additive was used, the effect of including an additive was not increased in proportional with the amount of additive added. This is presumably because an increase in the amount of additive added may increase thicknesses of positive/negative electrode membranes.

Referring to FIG. 4 (18650 cylindrical batteries), when a battery using a 5 V grade spinel-type active material was allowed to stand at a high temperature, the internal pressure of the battery was increased due to decomposition of electrolyte, causing a current interrupt device (CID) to be opened, stopping the battery from operating. However, when pyridine was used as an additive, electrolyte decomposition was delayed, so that an increase in resistance of was reduced, thereby delaying the OCV drop.

Referring to FIG. 5 (18650 cylindrical batteries), a considerable increase in the resistance, i.e., 95 mΩ, was demonstrated in the battery according to Comparative Example 1, 3 days after the CID was opened. However, in the battery according to Example 1 in which 1 wt % of pyridine was included as an additive, opening of the CID was caused after the OCV was maintained for 10 days. In addition, after 5 days, the resistance was 45 mΩ, which is half that of comparative example 1.

EXPERIMENTAL EXAMPLE 3

Evaluation of Retention Time with Pyridine Added

Figure 6:
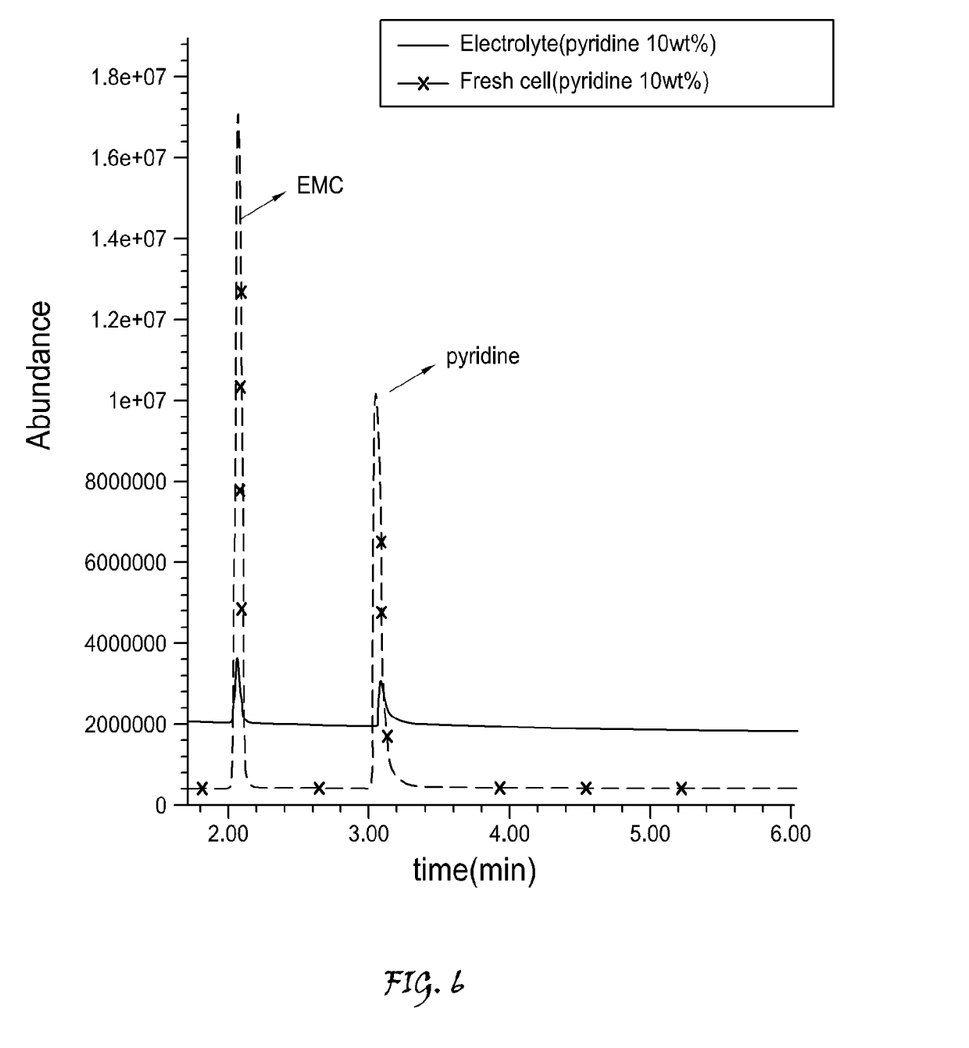
FIG. 6 is a graph showing results of gas chromatography-mass (GC-MS) analysis conducted by a method of Experimental Example 3 for measuring a retention time of the electrolyte including a pyridine derivative as an additive according to an embodiment.

Presence of an additive being present in the electrolyte was confirmed by GC-MS analysis. Initially, an electrolyte with pyridine 10 wt % was confirmed to have a pyridine peak at a retention time of 3 minutes. A cell including an electrolyte with pyridine 10 wt % that had been charged after formation charging and discharging also had displayed a pyridine peak with a retention time around 3 minutes. The retention time of the electrolyte including the pyridine derivative as an additive was measured by gas chromatography-mass (GC-MS) analysis and the results are shown in FIG. 6. Measurement conditions of the GC-MS analysis are as follows:

Agilent 6890 GC coupled to an Agilent 5973 MSD (Mass Selective Detector)

The GC running conditions: 10° C. /min, 40° C. (5 min) to 250° C. (10 min)

Inlet 290° C., split ratio of 1:50

Mass range: 10~500 amu

Although the present embodiments have been described with reference to certain exemplary embodiments, it will be understood by those skilled in the art that various modifications and equivalent arrangements may be made without departing from the spirit or scope of the present disclosure as set forth in the following claims.

What is claimed is:

1. A lithium rechargeable battery having an operating voltage of 4.3 V or higher, the battery comprising:
an electrolyte;
a positive electrode including a positive electrode active material capable of accepting or releasing lithium ions; and
a negative electrode including a negative electrode active material capable of accepting or releasing lithium ions, wherein the electrolyte consists of:
a non-aqueous organic solvent;
a lithium salt; and
an additive, wherein the additive is an aromatic amine of Formula (1):

(1)

wherein $R_1$, $R_2$, $R_3$, $R_4$, and $R_5$ are each independently a hydrogen, a substituted or unsubstituted C1 to C6 alkyl group, a substituted or unsubstituted C1 to C6 alkoxy group, a substituted or unsubstituted C6 to C18 aromatic group, —F, OH, —OCF$_3$, —N(CF$_3$)$_2$ or —CF$_3$ where at least one of $R_1$, $R_2$, $R_3$, $R_4$, and $R_5$ is not hydrogen, and wherein the positive electrode active material includes at least one of Formulas 14 to 18:

$$Li_{1+x}Ni_yMn_{1-y-z}M_zO_2 \quad (14),$$

wherein $0 \leq x < 0.2$, $0.4 \leq y \leq 0.6$, $0 \leq z \leq 0.2$, $0 \leq w \leq 0.1$, and M is at least one selected from the group consisting of Co, Al, Ti, Mg, and Zn;

$$Li_{1+x}Ni_yMn_{2-y-z}M_zO_{4+w} \quad (15),$$

wherein $0 \leq x < 0.2$, $0.4 \leq y \leq 0.6$, $0 \leq z \leq 0.2$, $0 \leq w \leq 0.1$, and M is at least one selected from the group consisting of Al, Ti, Mg, and Zn;

$$Li_{1+z}Ni_bMn_cCo_{1-(b+c)}O_2 \quad (16),$$

wherein $0 \leq z < 0.1$, $0.2 \leq b \leq 0.7$, $0.2 \leq c < 0.7$, and $b+c<1$;

$$LiCoPO_4 \quad (17);$$

and $$LiFePO_4 \quad (18).$$

2. The battery of claim 1 having an operating voltage of 4.3 V to 5 V.

3. The battery of claim 1 having an operating voltage of 4.35 V to 4.8 V.

4. A lithium rechargeable battery having an operating voltage of 4.3 V or higher, the battery comprising:
an electrolyte;
a positive electrode including a positive electrode active material capable of accepting or releasing lithium ions; and
a negative electrode including a negative electrode active material capable of accepting or releasing lithium ions, wherein the electrolyte comprises:
a non-aqueous organic solvent;
a lithium salt; and
an additive, wherein the additive is an aromatic amine, wherein the aromatic amine is at least one selected from pyridine derivatives of Formulas (19) to (21):

(19)

Pyridine derivative 1 and
(20)

Pyridine derivative 2 and
(21)

Pyridine derivative 3 wherein the positive electrode active material includes at least one of Formulas 14 to 18:

$$Li_{1+x}Ni_yMn_{1-y-z}M_zO_2 \quad (14),$$

wherein $0 \leq x < 0.2$, $0.4 \leq y \leq 0.6$, $0 \leq z \leq 0.2$, $0 \leq w \leq 0.1$, and M is at least one selected from the group consisting of Co, Al, Ti, Mg, and Zn;

$$Li_{1+x}Ni_yMn_{2-y-z}M_zO_{4+w} \quad (15),$$

wherein $0 \leq x < 0.2$, $0.4 \leq y \leq 0.6$, $0 \leq z \leq 0.2$, $0 \leq w \leq 0.1$, and M is at least one selected from the group consisting of Al, Ti, Mg, and Zn;

$$Li_{1+z}Ni_bMn_cCo_{1-(b+c)}O_2 \quad (16),$$

wherein $0 \leq z < 0.1$, $0.2 \leq b \leq 0.7$, $0.2 \leq c \leq 0.7$, and $b+c<1$;

$$LiCoPO_4 \quad (17);$$

and $$LiFePO_4 \quad (18).$$

5. The battery of claim 1, wherein the lithium salt is one or more selected from the group consisting of LiPF$_6$, LiBF$_4$, LiSbF$_6$, LiAsF$_6$, and LiN(SO$_2$C$_2$F$_5$)$_2$.

6. The battery of claim 1, wherein the positive electrode active material is LiNi$_{0.5}$Mn$_{1.5}$O$_4$.

* * * * *